May 30, 1961 JAN KIE YAP ET AL 2,986,233
IMPINGEMENT MIST SEPARATOR
Filed July 25, 1958 2 Sheets-Sheet 1

INVENTORS:
*JAN KIE YAP*
WILLEM H. MANGER
BY: *Oswald H. Milmore*
THEIR ATTORNEY May 30, 1961 JAN KIE YAP ET AL 2,986,233
IMPINGEMENT MIST SEPARATOR
Filed July 25, 1958 2 Sheets-Sheet 2

INVENTORS:
JAN KIE YAP
WILLEM H. MANGER
BY: *Oswald H. Milmore*
THEIR ATTORNEY

2,986,233

IMPINGEMENT MIST SEPARATOR

Jan Kie Yap and Willem Hendrik Manger, Delft, Netherlands, assignors to Shell Oil Company, a corporation of Delaware Filed July 25, 1958, Ser. No. 751,074

Claims priority, application Netherlands July 29, 1957

7 Claims. (Cl. 183—93)

The invention relates to an impingement mist separator, for removing liquid particles from a gas stream in which they are entrained. Such a separator may be applied wherever fine liquid drops must be separated from a gas stream, for example, above a contacting tray of a gas-liquid contacting column, such as are used for fractional distillation, rectification, scrubbing, absorption, etc., or within the upper part of a steam-and-water drum.

Devices for separating mist from gas by centrifugal action are known. They include a gas riser duct surmounted by a deflecting surface which is curved to cause the gas to move along a curved path, whereby the liquid particles are hurled against the deflector and enter a collecting pocket. In one form of known construction, exemplified by the U.S. patent to Hagenbuch, No. 2,042,150, the dried gas moves downwards from the deflecting surface about the riser duct; in another form, shown in the U.S. patent to Gibson, No. 1,730,133, the gas escapes upwards through restricted passages in the deflecting wall. In both constructions the gas is subjected to a significant flow resistance, resulting in unfavorable pressure drops. Moreover, the separating efficiencies are acceptable only for limited ranges of gas flow rates, and the devices are complicated in construction and installation.

The principal object of this invention is to improve the operation of inertial type mist separators in such a manner that a high separation efficiency at a low pressure loss is obtained, even at high gas velocities.

Another object is to simplify the construction of the mist separator.

According to the invention the foregoing objects are attained by mounting above the upper, open end of a gas riser duct a liquid-catching cap which has an elongated, impervious coalescing plate extending continuously over the entire area of the duct and bent to form a series of flat or curved sections which provide at least one downwardly directed salient situated inwardly from the plate margin and extending longitudinally, and a gutter beneath each said salient for collecting coalesced liquid dripping therefrom, the cap being laterally open to permit gas to escape freely at a level above that of the duct.

The coalescing plate is bent either in a zigzag pattern or along undulating curves, to provide contiguous sections which are flat or curved and extend between different levels, so that liquid coalesced thereon will drain to the lowermost parts of the salients, and the gutter for receiving liquid dripping from such salients extend over limited areas, so that the major part of the plate area is exposed to the ascending gas stream for impingement thereby. Two opposite sides of the plates preferably extend substantially vertically downward to form side sections, their lower ends being similarly provided with gutters. The ends of the cap transverse to these opposite sides are preferably both open for the free escape of gas immediately beneath the plate.

Excellent results are attained when the coalescing plate is bent to have the cross section of the letter M.

The invention will be further described with reference to the accompanying drawing forming a part of this specification and showing certain illustrative embodiments, wherein.

Figure 1:
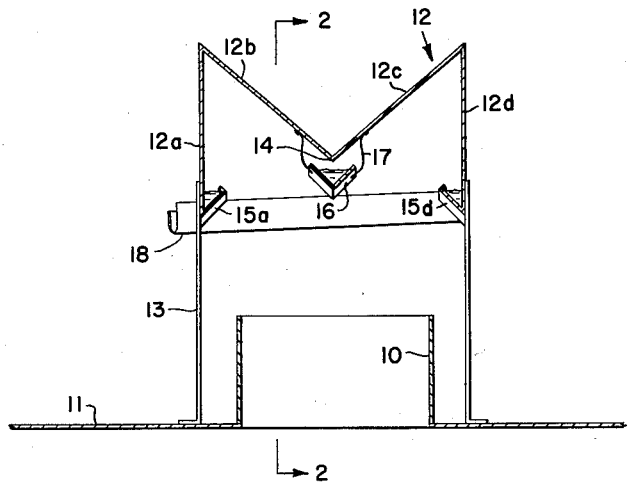
Figure 1 is a vertical sectional view through a portion of a tray provided with the mist separator according to the invention.
Figure 2:
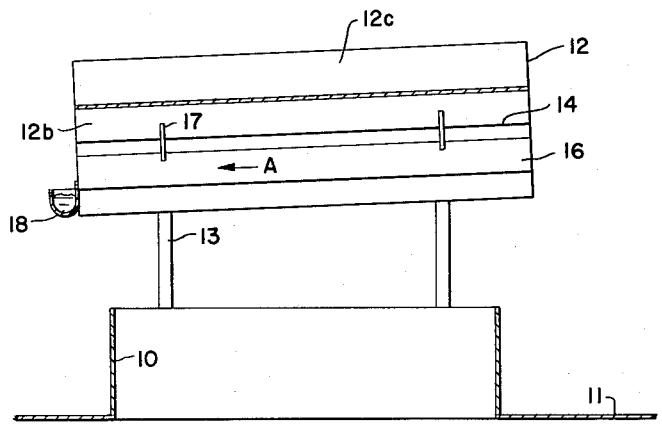
Figure 2 is a vertical sectional view taken on the line 2—2 of Figure 1.

Referring to Figures 1 and 2, 10 is a gas riser duct of any desired shape, e.g., rectangular, mounted in a horizontal wall 11 which may, for example, be a tray of a contacting column. Superposed on the duct is the liquid-catching cap shown in Figures 1 and 2 which includes an elongated imperforate coalescing plate 12 bent into a zigzag pattern to have a cross section of the letter M and supported by any suitable means, such as posts 13. The plate provides a plurality of contiguous sections 12a–12d, each of which extends between different levels, the inner sections jointly forming a central, downwardly directed ridge or salient 14 which extends the full length of the plate. The sections 12a and 12d at opposite sides of the plate extend vertically downwards while the ends of the said cap which are transverse to these sides are fully open. The lower edges of the side sections are bent inward and upward to form gutters 15a and 15d which are in liquid-receiving relation to the inner faces of these sections. A central gutter 16 is mounted by hangers 17 beneath the salient 14. The gutters 15a, 15d and 16 collectively occupy a minor fraction of the projected area of the plate 12, whereby most of the underside of the plate is exposed to the gas.

The gutters form drain channels and are advantageously inclined; for example, they may be inclined downwards in the direction of the arrow A in Figure 2 at a slope of 1:25, although such inclination is not in every case essential. These drain channels may optionally be provided with a collecting pipe 18.

It was found that best results are obtained when the bottom of the cap (i.e., the lower edges of the gutters 15a and 15d) are spaced above the top of the duct 10 by a distance equal to 0.4 to 0.5 the width of the duct, said width being measured in the direction normal to the vertical sections 12a and 12d.

Operation is as follows: Gas which entrains small liquid drops or mist ascends through the riser duct 10, impinges on the underside of the plate 12, changes direction, and flows along the underside of the cap to the open ends of the cap; thence the gas flows upward beyond the cap. As a result of the impingement against the plate 12 the liquid particles are coalesced and retained on the plate. The separated liquid flows down by gravity along the sections 12a—12d of the plate into the gutters 15a, 15d and 16, by which it is removed from the cap into the collecting pipe 18. When this pipe is not provided the gutters discharge onto the wall or tray 11.

Because the liquid-catching cap is provided with gutters, the liquid separated from the gas stream will collect in these channels and, consequently, will not be re-entrained in the gas.

The apparatus has the advantage over prior mist separators of the type mentioned above of possessing a high separating efficiency, even at high gas velocities, and only a very low pressure loss.

Figure 3:
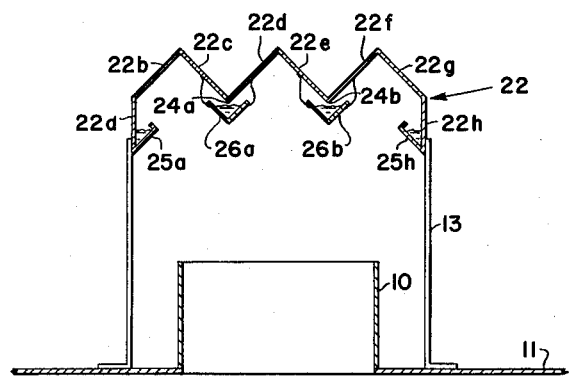
Figures 3 and 4 are vertical sectional views showing two modified shapes of the coalescing plate.

In the embodiment shown in Figure 3 wherein like reference numbers denote like parts, the cap has a coalescing plate 22 which is bent in a zigzag pattern so as to provide a larger number of flat, inclined sections 22a–22h, of which the first and last are vertical as in the first embodiment and have their lower margins bent to form gutters 25a and 25h. Every second section forms with an adjoining section a downwardly projecting ridge or salient 24a or 24b and beneath each of these is mounted a gutter 26a or 26b.

Figure 4:
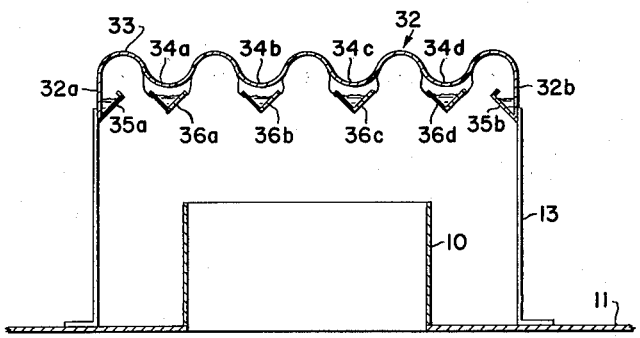

The embodiment of Figure 4 differs from that of Figure 3 in that the coalescing plate 32 is bent to have an undulating cross section to provide a series of curved sections extending from the upper levels 33 to rounded downward salients 34a–34d. The side sections 32a and 32b are vertical and bent to form gutters 35a and 35b. Beneath each of the downward salient is a gutter, shown at 36a–36d.

The operation of the embodiments of Figures 3 and 4 is like that described for Figures 1 and 2.

Tests were conducted on a device constructed according to Figures 1 and 2 with the following dimensions:

Cross section of riser duct _____ 55 mm. × 155 mm.
Width of cap _____ 60 mm.
Length of cap _____ 165 mm.
Height of vertical walls 12a and 12d _____ 35 mm.
Clearance of cap above top of riser _____ 25 mm.

Air containing 20% by weight of mist having a Sauter-mean drop size of 180 microns was flowed up through the duct at various velocities, with the following results:

| Flow Velocity, meters/sec. | Pressure-Loss Coefficient | Separating Efficiency, percent |
|---|---|---|
| 4 | 3.5 | 95.2 |
| 8 | 2.9 | 97.8 |
| 12 | 2.8 | 96.9 |

The separating efficiency is the percent by weight of the moisture initially present in the air which was separated by the cap.

The pressure loss coefficient is the factor $c$ in the equation $$\Delta P = \frac{c \rho U^2}{2 g_o}$$

where $\Delta P$ is the pressure drop in millimeters of water column.
$\rho$ is the density of the gas in kilograms per cubic meter.
$U$ is the gas velocity in meters per second.
$g_c$ is the gravitational conversion factor, in our case 9.81.

For a cap similarly mounted but wherein the coalescing plate has a central ridge and the cap was closed on all sides, the two long side walls having chevron passages for the outflow of gas, the pressure loss coefficient for the above flow rates varied between 16.0 and 11.5 and the separating efficiency varied between 91% and 63% as the flow rate was increased from 4 to 12 meters per second.

We claim as our invention:

1. Apparatus for the separation of liquid particles from a gas stream comprising: a riser duct with an upwardly directed terminus for the upflow of said gas stream and discharge from said terminus as a free stream together with entrained liquid particles; and a liquid-catching cap superposed over the upper end of said duct, said cap including an elongated, imperforate coalescing plate extending continuously over the entire area of the upper end of the duct in spaced relation thereto so as to be impinged directly by the free gas stream and having a plurality of contiguous sections extending between different levels and forming at least one downwardly directed salient situated at an inner part of the plate and extending longitudinally, and gutter means extending beneath said salient in liquid-receiving relation thereto, said gutter means being situated in the path of said free gas stream and having a restricted aggregate area and leaving the major part of the plate area exposed to said gas stream, said cap providing a lateral opening at a level above the top of said riser duct for the free discharge of gas which flows along the underside of said plate after impingement thereon.

2. Apparatus according to claim 1 wherein said plate is bent to form a series of substantially flat sections meeting along upper and lower ridges, each of the latter ridges forming a salient.

3. Apparatus according to claim 1 wherein said plate is corrugated and has a cross sectional shape of an undulating curve.

4. Apparatus according to claim 1 wherein said plate has a pair of substantially vertical sections situated at opposite margins thereof, and a gutter extending along the lower edge of each of said vertical sections in liquid-receiving relation to the inner face thereof.

5. Apparatus according to claim 4 where said cap is fully open at the ends of said plate which are transverse to the said opposite margins.

6. Apparatus according to claim 1 wherein said plate has a cross section shaped as the letter M and includes a gutter along the lower edge of each of the outer walls, said cap being open at the ends thereof which are transverse to said outer walls.

7. Apparatus according to claim 1 wherein said entire cap, including the gutter means, are situated in spaced relation above the upper end of the riser duct.

References Cited in the file of this patent

UNITED STATES PATENTS

| | | |
|---|---|---|
| 1,200,024 | Radiguer | Oct. 3, 1916 |
| 1,521,262 | Wainwright | Dec. 30, 1924 |
| 1,918,005 | Urquhart | July 11, 1933 |
| 2,239,709 | Goldstein | Apr. 29, 1941 |
| 2,277,670 | Weisgerber | Mar. 31, 1942 |
| 2,523,529 | Zwickl | Sept. 26, 1950 |